(12) United States Patent
Garofalo

(10) Patent No.: US 6,725,970 B2
(45) Date of Patent: Apr. 27, 2004

(54) STABILITY ALIGNMENT FRAME FOR ERECTING A PORTABLE MULTI-PURPOSE STAND

(76) Inventor: Tony Garofalo, 118 Lakeshore Blvd., Kingston, Ontario (CA), K7M 6R5

( * ) Notice: Subject to any disclaimer, the term of this patent is extended or adjusted under 35 U.S.C. 154(b) by 0 days.

(21) Appl. No.: 10/197,179

(22) Filed: Jul. 17, 2002

(65) Prior Publication Data

US 2003/0168283 A1 Sep. 11, 2003

(30) Foreign Application Priority Data

Mar. 8, 2002 (CA) .............................. 2375176

(51) Int. Cl.$^7$ ................................................. E06C 7/16
(52) U.S. Cl. ........................ 182/115; 182/116; 182/129; 182/187
(58) Field of Search ............................... 182/115, 116, 182/120, 129, 179, 187; 135/87; 248/168, 165

(56) References Cited

U.S. PATENT DOCUMENTS

| | | | | | |
|---|---|---|---|---|---|
| 2,982,379 | A | * | 5/1961 | Fisher ..................... | 182/115 X |
| 3,011,586 | A | * | 12/1961 | Harvey, Jr. ............. | 182/115 X |
| 3,933,372 | A | * | 1/1976 | Herndon .................. | 280/150.5 |
| 3,967,694 | A | * | 7/1976 | Woolfolk, Sr. ............... | 182/82 |
| 4,086,980 | A | | 5/1978 | Shortes et al. ............... | 182/151 |
| 4,274,508 | A | | 6/1981 | Hughes et al. .............. | 182/116 |
| 4,641,676 | A | * | 2/1987 | Lynch ...................... | 135/110 |
| 4,695,021 | A | * | 9/1987 | Leinfelder ................. | 248/168 |
| 4,759,660 | A | * | 7/1988 | Corbett .......................... | 405/7 |
| 4,787,477 | A | * | 11/1988 | Dolan ........................ | 182/116 |
| 5,009,283 | A | | 4/1991 | Prejean ...................... | 182/116 |
| 5,327,993 | A | | 7/1994 | Stark, Sr. .................... | 182/179 |
| 5,456,334 | A | | 10/1995 | Brignac ...................... | 182/179 |
| 5,485,978 | A | | 1/1996 | Hernandez ................. | 248/165 |
| 5,791,436 | A | | 8/1998 | Talley, Sr. .................. | 182/116 |
| 5,927,435 | A | | 7/1999 | Benton ....................... | 182/116 |
| 6,035,968 | A | | 3/2000 | Morales ..................... | 182/141 |
| 6,095,474 | A | * | 8/2000 | Arnold ....................... | 248/352 |
| 6,199,660 | B1 | | 3/2001 | Meeks ........................ | 182/116 |
| 2002/0078624 | A1 | * | 6/2002 | Saxon et al. ................... | 47/42 |
| 2002/0070705 | A1 | * | 4/2003 | Hayden et al. ............. | 136/251 |

FOREIGN PATENT DOCUMENTS

EP 1142756 * 4/2001 ............. 182/115 X

* cited by examiner

Primary Examiner—Bruce A. Lev
(74) Attorney, Agent, or Firm—Duane Morris LLP

(57) ABSTRACT

A stability alignment frame useful for the erection of an observation or hunting stand includes a plurality of vertical posts. A horizontal framework interconnects adjacent posts and a leg is secured to an associated vertical post. Each leg extends downwardly and outwardly. A first stabilizing member interconnects non-adjacent, opposed legs, thereby providing a plurality of interconnected legs. Structure is provided for applying a force to the interconnected legs to change the spacing between the bases of a pair of the interconnected legs, thereby providing a wedging action between the stability alignment frame and an elevated vantage point. This provides a stable base for supporting the elevated vantage point.

21 Claims, 8 Drawing Sheets

US 6,725,970 B2

STABILITY ALIGNMENT FRAME FOR ERECTING A PORTABLE MULTI-PURPOSE STAND

(1) BACKGROUND OF THE INVENTION (a) Aims of the Invention

The present invention relates generally to a support base frame, denoted herein as a "Stability Alignment Frame" or "STAF". This STAF can be used, for example, as the stable base for the erection of an observation and hunting stand, which is configured for ease of portability and disassembly.

(b) Description of the Prior Art

Hunters, nature watchers, or guards usually require an elevated means to obtain a higher vantage point for observing games, animals, birds or people. Many such means have been described in the prior art, but these seem to have one or other drawbacks.

U.S. Pat. No. 3,967,694 (Woolfolk Sr., 1976), U.S. Pat. No. 5,327,993 (Stark, Sr., 1994), and U.S. Pat. No. 6,035,968 (Morales, 2000) each disclose platforms for fishing, hunting or the like that are collapsible and portable.

U.S. Pat. No. 4,086,980 (Shortes et al., 1978), U.S. Pat. No. 4,274,508 (Hughes et al., 1981), and U.S. Pat. No. 5,791,436 (Talley, Sr., 1998), each disclose sectional ladders and stands, per se.

U.S. Pat. No. 5,009,283 (Prejean 1991), U.S. Pat. No. 5,485,978 (Hernandez 1996), U.S. Pat. No. 5,927,435 (Benton, 1999); and U.S. Pat. No. 6,199,660 (Meeks 2001) each disclose hunting stands, per se.

U.S. Pat. No. 5,456,334 (Brignac, 1995) discloses ladders having adjustable legs or similar elements.

None of the prior art patents teach the concept of an adjustable, portable, multi-purpose stand which may be easily assembled and disassembled, that is based on a stability alignment frame (STAF), which is configured to provide stability to such multi-purpose stands by resisting forces of the weight of the multi-purpose stand and the user, where, in the absence of the STAF, the multi-purpose stand may fall apart.

(2) SUMMARY OF THE INVENTION (a) Aims of the Invention

It is a first object of the present invention to obviate or mitigate at least one disadvantage of the prior art.

It is a second object of the present invention to provide stabilizing means for a multi-purpose stand comprising a plurality of components and a vantage point, e.g., a housing unit.

It is a third object of the present invention to provide such a multi-purpose stand in which structure is provided to cause the plurality of component elements to be wedged together so that they cannot accidentally fall apart.

It is a fourth object of the present invention to provide a multi-purpose stand that is adjustable to provide different vantage points for the user.

It is a fifth object of the present invention to provide a multi-purpose stand that can be used for a variety of purposes.

It is a sixth object of the present invention to provide a multi-purpose stand that can be assembled and dissembled by a single user.

It is a seventh object of the present invention to provide a multi-purpose stand that can be dissembled into component elements for easy transport and storage.

It is an eighth object of the present invention to provide a multi-purpose stand whose component elements can be manufactured separately.

(b) Statements of Invention

This invention, in a first embodiment, provides a stability alignment frame which includes a plurality of vertical posts and a horizontal framework interconnecting adjacent posts. A leg is secured to an associated vertical post, each leg extending downwardly and outwardly. A first stabilizing member interconnects non-adjacent, opposed legs, thereby providing a plurality of interconnected legs. First structure is provided for applying a force to the interconnected legs to change the spacing between the bases of a pair of the interconnected legs. In this way, a wedging action is provided between the stability alignment frame and an elevated vantage point supported thereon, thereby to prevent accidental disassembly.

The present invention, in a second embodiment, also comprises a multi-purpose stand including a stability alignment frame and an elevated vantage point. The stability alignment frame includes a plurality of vertical posts and a horizontal framework interconnecting adjacent posts. A leg is secured to an associated vertical post, each leg extending downwardly and outwardly. A first stabilizing member interconnects non-adjacent, opposed legs, thereby providing a plurality of interconnected legs. First structure is provided for applying a force to the interconnected legs to change the spacing between the bases of a pair of the interconnected legs. The elevated vantage point is connected to the stability alignment frame by male members and female sockets which are operatively associated with the stability alignment frame members and with the vantage point. In this way, a wedging action is provided between the stability alignment frame and an elevated vantage point supported thereon, thereby to prevent accidental disassembly.

The present invention also provides in a third embodiment, a kit comprising a plurality of components which are configured to be assembled to provide the stability alignment frame. The stability alignment frame which includes a plurality of vertical posts and a horizontal framework interconnecting adjacent posts. A leg is secured to an associated vertical post, each leg extending downwardly and outwardly. A first stabilizing member interconnects non-adjacent, opposed legs, thereby providing a plurality of interconnected legs. First structure is provided for applying a force to the interconnected legs to change the spacing between the bases of a pair of the interconnected legs.

In a fourth embodiment, a kit is provided comprising a plurality of components which are configured to be assembled to provide a multi-purpose stand including the stability alignment frame and an elevated vantage point. The stability alignment frame includes a plurality of vertical posts and a horizontal framework interconnecting adjacent posts. A leg is secured to an associated vertical post, each leg extending downwardly and outwardly. A first stabilizing member interconnects non-adjacent, opposed legs, thereby providing a plurality of interconnected legs. First structure is provided for applying a force to the interconnected legs to change the spacing between the bases of a pair of the interconnected legs. The elevated vantage point is connected to the stability alignment frame by male members and female sockets which are operatively associated with the stability alignment frame members and with the vantage point. In this way, a wedging action is provided between the stability alignment frame and an elevated vantage point supported thereon, thereby to prevent accidental disassembly.

(c) Other Features of the Invention

By a first feature of this first broad embodiment of the present invention, the first structure for applying a force to the interconnected legs to change the spacing between the bases of a pair of interconnected legs applies a compressive force to the interconnected legs, thereby to change the spacing between the bases of a pair of the interconnected legs by drawing the legs closer together.

By a second feature of this first broad embodiment of the present invention, the first structure for applying a force to the interconnected legs to change the spacing between the bases of a pair of interconnected legs applies an extensive compressive force to the interconnected legs, thereby to change the spacing between the bases of a pair of the interconnected legs by pushing the legs further apart.

By a third feature of this first broad embodiment of the present invention, and/or the above features thereof, the stability alignment frame includes four vertical posts which are oriented to meet at an imaginary apex.

By a fourth feature of this first broad embodiment of the present invention, and/or the above features thereof, the stability alignment frame has three legs which are oriented with respect to each other to meet at an imaginary apex.

By a fifth feature of this first broad embodiment of the present invention, and/or the above features thereof, the stability alignment frame has up to ten legs which are oriented with respect to each other to meet at an imaginary apex.

By a sixth feature of this first broad embodiment of the present invention, and/or the above features thereof, the vertical post is rectangular, e.g., square, in cross section.

By a seventh feature of this first broad embodiment of the present invention, and/or the above features thereof, each vertical post includes an upstanding male member for interconnection to a female socket of a further vertically-oriented member.

By an eighth feature of this first broad embodiment of the present invention, and/or the above features thereof, each vertical post comprises a female socket for interconnection with a depending male member of a further vertically-oriented member.

By a ninth feature of this first broad embodiment of the present invention, and/or the above features thereof, each vertical post has a first upper end and a second lower end.

By a tenth feature of this first broad embodiment of the present invention, and/or the above features thereof, the horizontal framework is connected to the first upper ends of the vertical posts.

By an eleventh feature of this first broad embodiment of the present invention, and/or the above features thereof, the horizontal framework is connected to the second lower ends of the vertical posts.

By a twelfth feature of this first broad embodiment of the present invention, and/or the above features thereof, a first horizontal framework is connected to the first upper ends of the vertical posts and a second horizontal framework is connected to the second lower ends of the vertical posts.

By a thirteenth feature of this first broad embodiment of the present invention, and/or the above features thereof, the first stabilizing member is disposed below the connection of the legs to the vertical posts.

By a fourteenth feature of this first broad embodiment of the present invention, and/or the above features thereof, the first stabilizing member is disposed adjacent to the connection of the leg to an associated vertical post.

By a fifteenth feature of this first broad embodiment of the present invention and/or the above features thereof, the stability alignment frame includes a second horizontal framework.

By a sixteenth feature of the fifteenth feature of this first broad feature of the present invention, the stability alignment frame includes a second stabilizing member which is disposed between the first horizontal framework and the second horizontal framework.

By a seventeenth feature of this first broad embodiment of the present invention, and/or the above features thereof, at least one of the stabilizing members comprises a rod, whereby an extensive force may be applied to the legs.

By an eighteenth feature of this first broad embodiment of the present invention, and/or the above features thereof, at least one of the stabilizing members comprises a chain, whereby an compressive force may be applied to the legs.

By an nineteenth feature of this first broad embodiment of the present invention, and/or the above features thereof, the base of each of the legs is provided with wheels.

By a twentieth feature of this first broad embodiment of the present invention, and/or the above features thereof, the base of each of the legs is provided with flat shoes or anchor plates.

By a twenty-first feature of this first broad embodiment of the present invention, and/or the above features thereof, at least one of the legs further includes a detachable telescopic member which is attachable to that leg.

By a first feature of this second broad embodiment of the present invention, the vantage point is a housing unit.

By a second feature of this second broad embodiment of the present invention, and/or the above feature thereof, the multi-purpose stand additionally includes a vertical riser section comprising a plurality of vertical ladders which are connected to the stability alignment frame and to the vantage point/housing unit. By a first feature of that feature, the vertical ladders are connected to the stability alignment frame at one end by male members and female sockets which are operatively associated with the stability alignment frame and the vertical riser, and to the vantage point or housing unit at the second end by male members and female sockets which are operatively associated with the vertical riser and the vantage point or housing unit. By a second feature of that feature, the vertical riser includes both a front ladder and a rear ladder which are connected to the stability alignment frame at a first end and to the housing unit at a second end, each ladder having vertical parallel rails which are connected by horizontal rungs, and the front ladder being connected to rear ladder by braces.

By a third feature of this second embodiment of the present invention and/or the above features thereof, the male members are provided on the stability alignment frame, and cooperative female sockets are provided in the vantage/point housing unit.

By a fourth feature of this second embodiment of the present invention and/or the above features thereof, the male members are provided on the vantage/point housing unit, and cooperative female sockets are provided in the stability alignment frame.

By a fifth feature of this second embodiment of the present invention and/or the above features thereof, the multi-purpose stand additionally includes a vertical riser section comprising a plurality of vertical ladders which are connected to the stability alignment frame and to the housing unit.

By a sixth feature of this second embodiment of the present invention and/or the above features thereof, the vertical ladders are connected to the stability alignment frame at a first end by male members and female sockets which are operatively associated with the stability alignment frame and with the vertical riser section, and to the vantage point/housing unit at a second end by male members and female sockets which are operatively associated with the vertical riser section and with the vantage point/housing unit. By a first feature of that feature, the male members are provided on the vertical riser section, and cooperative female sockets are provided in the stability alignment frame. By a second feature of that feature, the male members are provided on the stability alignment frame, and cooperative female sockets are provided in the vertical riser section.

By a seventh feature of this second embodiment of the present invention and/or the above features thereof, depending male members are provided on the vantage point/housing, and cooperative female sockets are provided in the vertical riser section.

By an eighth feature of this second embodiment of the present invention and/or the above features thereof, upstanding male members are provided on the vertical riser section, and cooperative sockets are provided in the vantage point/housing unit.

By a ninth feature of this second broad embodiment of the present invention, and/or the above features thereof, the vantage point/housing unit includes a three-dimensional framework for supporting a user.

By a tenth feature of this second broad embodiment of the present invention, and/or the above features thereof, the vantage point/housing unit further includes a three-dimensional framework including a plurality of vertical frame members and a plurality of horizontal frame members for providing guard rail around the housing unit.

By an eleventh feature of this second broad embodiment of the present invention, and/or the above features thereof, the vantage point/housing unit is provided with a platform as part of the three-dimensional framework. By a first feature of that feature, the platform includes a trap door for entering and leaving by a user. By a second feature of that feature, the three-dimensional framework has a cover for privacy and protection. By a third variation thereof, the cover has openings for observing, preferably wherein such openings are covered by transparent coverings, e.g., a synthetic plastic material, preferably polymethylmethacrylate.

By a twelfth feature of this second broad embodiment of the present invention, and/or the above features thereof, the three-dimensional framework is covered with a roof to provide protection from inclement weather.

By a thirteenth feature of this second broad embodiment of the present invention, and/or the above features thereof, the three-dimensional framework is provided with rings for tying the multi-purpose stand with a rope to a static anchor.

By an fourteenth feature of this second broad embodiment of the present invention, and/or the above features thereof, the vertical riser section further includes a third ladder that is attached to at least one of the first ladder and the second ladder for ascending and descending to that ladder to which is attached.

By a fifteenth feature of this second broad embodiment of the present invention, and/or the above features thereof, the ladder is attached to the members of the upright vertical frame of the vantage point/housing unit for ascending and descending by a user.

By a first feature of the first broad embodiment of the present invention, and by a first feature of the second broad embodiment of the present invention, and/or the above features of the first and second broad embodiments of the present invention, the height of the stability alignment frame is adjustable by means of varying the length of the legs by means of telescopic members cooperable therewith.

By a second feature of the first broad embodiment of the present invention, and by a second feature of the second broad embodiment of the present invention, and/or the above features of the first and second broad embodiments of the present invention, the height of the vantage point/housing unit is adjustable by means of variable length vertical frame members forming part of the three-dimensional framework.

By a third feature of the first broad embodiment of the present invention, and by a third feature of the second broad embodiment of the present invention, and/or the above features thereof of the first and second broad embodiments of the present invention, the various components of the stability alignment frame and/or the multi-purpose stand are made from metal, resilient plastic, rubber, glass fibers, wood or any combination thereof. By a first feature of that feature, the metal is aluminum, steel, brass, other alloys, or a combination thereof.

(d) Generalized Description of the Invention

As noted hereinabove, the concept of the STAF is based on the premise that it can be erected and disassembled by a single person, with average assembly aptitude, without the use of tools, in a short period of time, even while such person is exposed to weather elements typically experienced in North America throughout the year. A feature of the staff according to an embodiment of an aspect of the present invention is the ease of assembly/disassembly, its portability, its weight, its cost and its strength. The STAF can be assembled by using welds, pins, or nuts/bolts, or a combination thereof. Welds are strong but are permanent connections which fix some components of the STAF in place. Such welds reduce portability, but, on the other hand, eliminate the necessary alignment tolerance ("play") between components for assembly. Nuts/bolts are strong and allow for portability of the multi-purpose stand through assembly and disassembly, but require tools in the field. Pins allow for easy assembly and disassembly, and require no tools in the field.

One of the components of the STAF according to an embodiment of the present invention is a male pipe member whose cross-section is rectangular. The male pipe member is required, whether the vantage point/housing unit is connected directly to the STAF through a female socket, or if an optional vertical riser ladder assembly is used. The male pipe member is used for alignment purposes only, and does not serve any structural soundness or strength purposes. The vertical riser ladder assembly is an optional element which is used only to elevate the user to a higher vantage point. The male pipe member may be a separate pipe, which is not attached to the STAF or may be permanently attached to the STAF by welding.

The male pipe member of the STAF may be replaced by a depending male pipe member on the vantage point/housing unit, to cooperate with the hollow rectangular upper socket members of the STAF.

The STAF according to an embodiment of the present invention can, in one of its forms, be assembled and used by placing the vantage point/housing unit directly on the STAF according to an embodiment of the present invention without the vertical riser assembly. The purpose of the vertical riser assembly is to elevate the platform of the vantage point/housing unit for the benefit of the user. The STAF according to an embodiment of the present invention is stabilized by the forces created by tensioning or compressing the braces and also by the addition of weight to the STAF according to an embodiment of the present invention after assembly. The stabilization is hereby defined to be a "wedging action". The term "wedging action" could be considered as the non-technical description of the stabilization action of the STAF according to an embodiment of an aspect of the present invention. The multi-functioning member is thus named a "wedge", which provides "wedging action". In this specification that term is used in such sense and is referred to as such to avoid misinterpretation and misunderstanding.

The plurality of base components achieve full structural soundness and strength through "the wedging action" of the STAF according to an embodiment of the present invention to post-assembly forces when the stabilizing members (braces) are shortened or extended and of the resistance to gravitational forces of the self weight of the STAF plus any live load (user) which is added to the STAF according to an embodiment of an aspect of the present invention. The unique operation of the STAF according to an embodiment of the present invention is such that the structural soundness of the STAF according to an embodiment of the present invention increases as more weight is added to it after assembly. The STAF according to an embodiment of the present invention needs to have a minimum of three legs and preferably four legs. However, in other embodiments of the STAF according to the present invention, the STAF according to an embodiment of the present invention may have upwards of ten legs. The shortening or extending of the stabilizing members, (braces) stabilize the STAF according to an embodiment of the present invention through the "wedging action" described above.

The STAF according to an embodiment of the present invention without the optional vertical riser assembly requires a ladder to enable the user to ascend and descend to and from the vantage point/housing unit. The optional ladder has hooks on the top of the two vertical members and easily attaches to horizontal members of the vantage point/housing unit. The vertical riser assembly is constructed with horizontal members so that it also functions as a ladder. The optional vertical riser ladder assembly may be variable length, i.e., may be adjustable, or it may be provided with a plurality of vertical riser ladders assemblies of different fixed lengths. The ladders thus may be constructed to set lengths (i.e., 3', 6', 8', etc.) so that the user can select a vertical riser assembly for the desired elevation. The minimum length of the vertical riser assembly generally is 3' and could increase in 1' or 2' incremental lengths. For example, a user could assemble the multi-purpose stand with a 3' vertical riser ladder assembly, or a user could assemble the multi-purpose stand with a 6' vertical riser ladder assembly. The upper limit in height of the vertical riser ladder assembly is variable. Thus the vertical riser ladder assembly is optional and/or is not a requirement for assembly and/or function of the STAF according to an embodiment of the present invention. The user can add or remove the vertical riser to suit its needs.

The horizontal and vertical members of the three-dimensional framework also serve to protect the user from a fall. These horizontal members are best described as guard rails, and are designed to meet standard building codes and regulations.

The roof covering may be made of any waterproof material, e.g., wood, plastic, metal, fabric, etc. Attachable wheels can be substituted for the anchor plates or shoes at the base of the legs. This will allow the multi-purpose stand to be used on smooth surfaces, e.g., inside floors, outdoor parking lots, sound stages, etc.

In another feature of the STAF according to an embodiment of the present invention, the vantage point/housing unit is placed directly on the STAF according to another embodiment of the present invention. The depending male pipe member inserts into a female socket (i.e., of the hollow vertical posts) of the STAF according to an embodiment of an aspect of the present invention. The connection could be a weld or pin, but the preferred method of connection is a bolt to allow for slight movement of the male member for alignment purposes. The female sockets at the platform of the housing unit receive upstanding male members and are connected together using pins.

In yet another feature of the STAF according to an embodiment of the present invention, an optional vertical riser ladder assembly is used. The depending male pipe members of the ladder assembly inserts into the female sockets (i.e., of the hollow vertical posts) of the STAF according to an embodiment of the present invention. The connection could be a weld or a pin, but the preferred method of connection is a nut/bolt to allow for slight movement of the male member for alignment purposes. A first male pipe member is inserted into the female sockets of the vertical riser ladder assembly. A second male member which is identical to the first male member is inserted into the female socket of the vertical ladder assembly and into the female socket of the housing unit and is connected using pins.

As noted in the examples above, the STAF according to an embodiment of the present invention can be provided by members which can be made of metal, aluminum, metal alloys, rubber, fiberglass, wood, plastic, or a combination thereof. The STAF according to an embodiment of the present invention could preferably be manufactured in steel, alloys, stainless steel, carbon fibre, brass, but is not limited to any one of these or a combination of these could be used if they meet the design properties, and were cost effective, safe, and optimum in weight. The vertical riser ladder assembly can be made of metal, aluminum, metal alloys, fiberglass, wood, plastic, or a combination thereof. The vantage point/housing unit can be made of metal, aluminum, metal alloys, fiberglass, wood, plastic, fabric, or a combination thereof. The deciding factors of what material to use for each of the above elements can be determined by the strength of the material versus cost and weight.

(3) BRIEF DESCRIPTION OF THE DRAWINGS

In the accompanying drawings.

Figure 1:
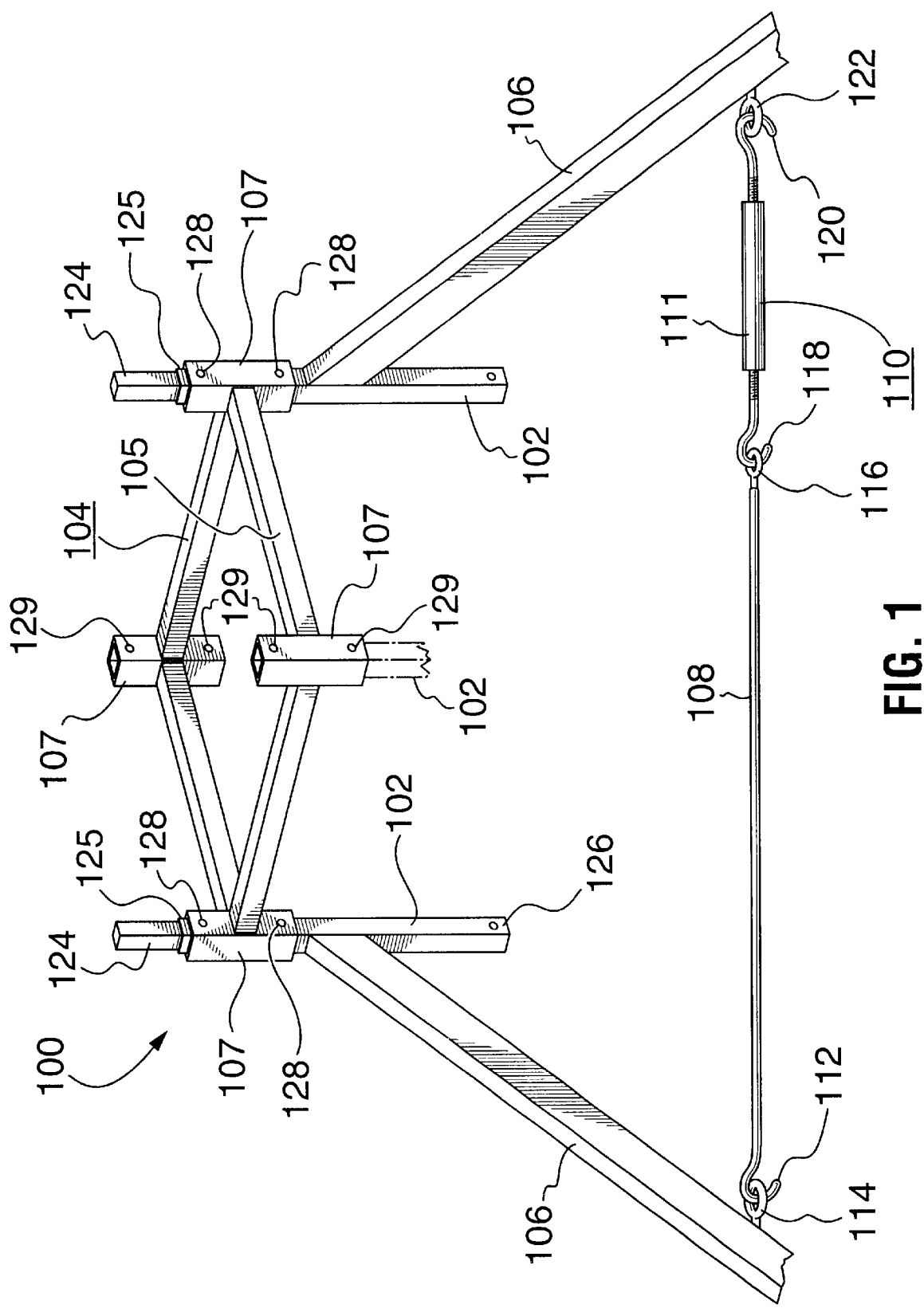
FIG. 1 is an isometric view of the operative elements of a stability alignment frame (STAF) of an embodiment of the present invention, wherein a framework forming an essential part of that embodiment of the present invention is connected to the upper end of the vertical posts.

(4) DESCRIPTION OF PREFERRED EMBODIMENTS (a) Description of FIG. 1

FIGS. 1 to 5 show several embodiments of the STAF according to an embodiment of an aspect of the present invention. The STAF 100 comprises four vertical posts 102 and a horizontal rectangular framework 104. This framework 104 includes four horizontal members 105 and four hollow vertical members 107. The interconnections to provide framework 104 are as follows:

The horizontal members 105 each connect to adjacent vertical members 107. Legs 106 are secured to associated vertical posts 102. Each leg 106 extends downwardly and outwardly. A first of two first stabilizing members 108 interconnects one set of nonadjacent, opposed legs, thereby providing a pair of interconnected legs. A second stabilizing member (not seen) interconnects the other non-adjacent legs 106. A first means 110 for applying a compressive force or extensive force to the interconnected non-adjacent legs 106 is configured to change the spacing (i.e., the footprint) between the pair of nonadjacent interconnected legs 106 by drawing the legs 106 closer together or by pushing the legs 106 further apart. A second similar first means (not seen) similarly changes the spacing (i.e., the footprint) between the other, interconnected non-adjacent legs 106.

As shown specifically in FIG. 1, the stabilizing member 108 comprises a hooked rod 112, which hooks onto an eye-bolt 114 which is secured to leg 106. Hooked rod 112 includes an eye 116. A turnbuckle 111 includes a first threaded hook 118, which hooks onto eye 116 and a second threaded hook 120 which hooks onto eye 122, which is secured to a non-adjacent leg 106. Rotation of turnbuckle 111 either increases or decreases the footprint of the base of the interconnected legs 106, either by pushing the non-adjacent legs 106 outwardly or by pulling the interconnected non-adjacent legs 106 together inwardly.

A similar arrangement is provided for the second stabilizing member for the same purpose.

In a preferred embodiment, each vertical post is rectangular, i.e., square, in cross-section. Each vertical post 102 is hollow and, in the embodiment shown, is provided with an upstanding male rectangular cross-section member 124, for connection to a further vertically-oriented member (i.e., not shown but which can be a vantage point/housing unit, or a vertical riser section) to be described later. Each vertical post 102 has a first upper end 124, and a second lower end 126.

In FIG. 1, the horizontal framework 104 is connected adjacent to the first upper ends 124, in the following manner:

Each hollow vertical member 107 slips over an associated vertical post 102. They are held in place by bolts 128, through cooperating apertures (not seen) in posts 102. Hollow vertical members 107 are provided with through holes 129.

Figure 2:
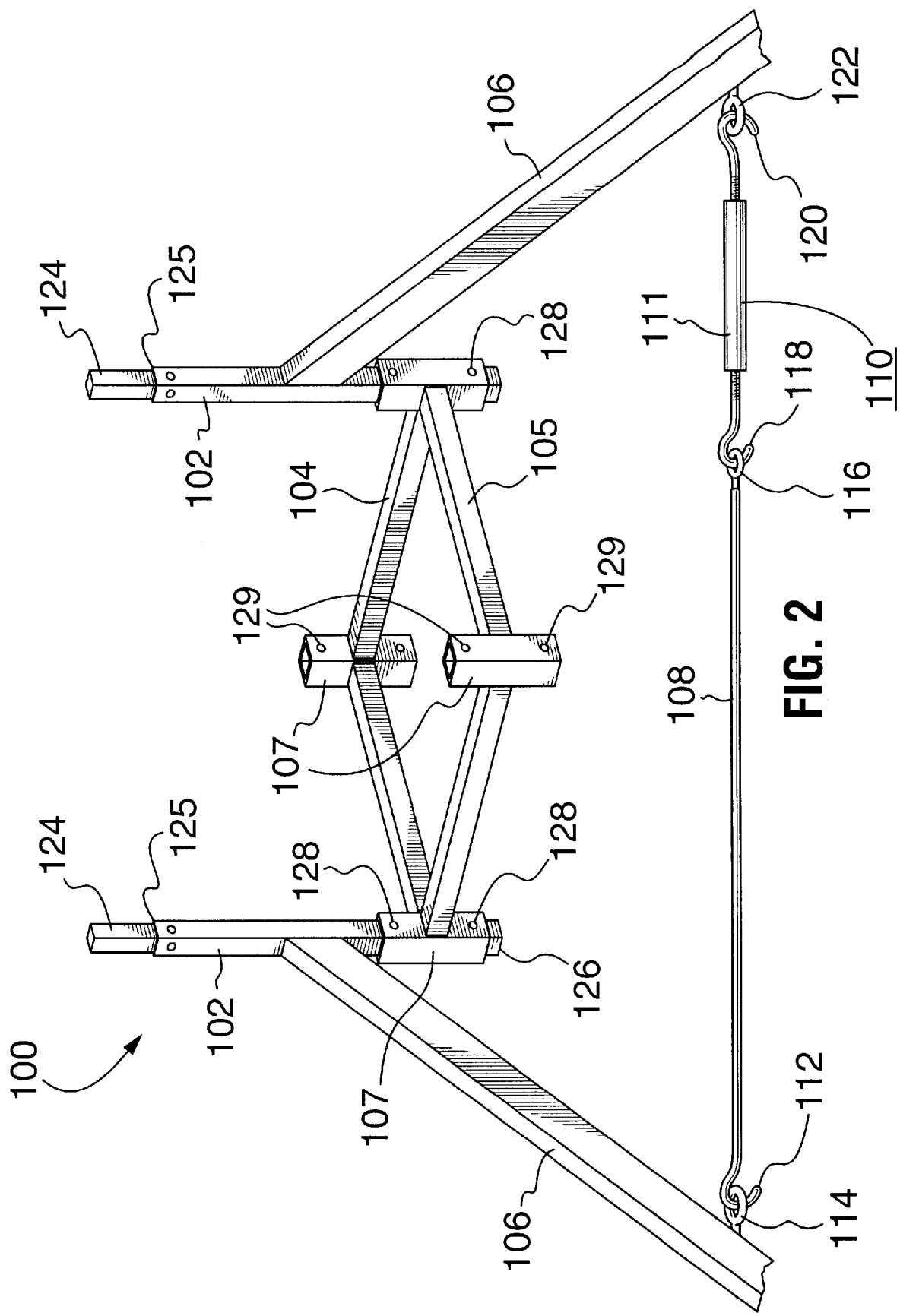
FIG. 2 is an isometric view of the operative elements of a stability alignment frame (STAF) of another embodiment of the present invention, wherein a framework forming an essential part of that embodiment of the present invention is connected to the lower end of the vertical posts.

(b) Description of FIG. 2

FIG. 2 shows the horizontal framework 104 connected adjacent to the second lower ends of posts 102, respectively, in the following manner:

Each hollow vertical member 107 slips under an associated vertical post 102. They are held in place by bolts 128 through cooperating apertures (not seen) in posts 102.

Figure 3:
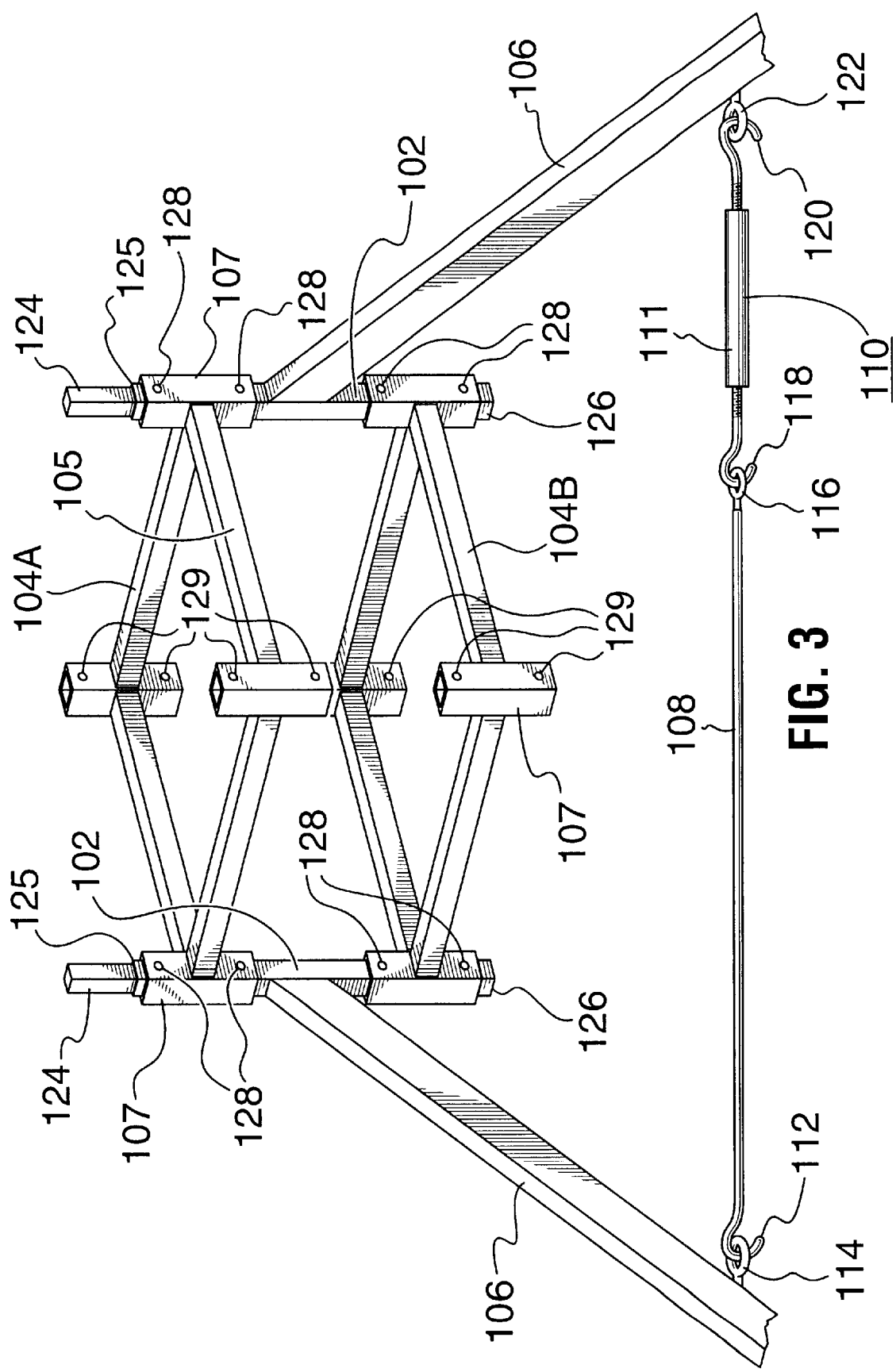
FIG. 3 is an isometric view of the operative elements of a stability alignment frame (STAF) of another embodiment of the present invention, wherein two frameworks forming essential parts of that embodiment of the present invention are connected, a first to the upper ends of the vertical posts and a second to the lower ends of the vertical posts.

In the embodiments shown in FIGS. 1 to 3, the two first stabilizing members 108 which are disposed below the connection of the legs 102 to the associated posts 102. Hollow vertical members 107 are provided with through holes 128.

(c) Description of FIGS. 3 to 6

FIG. 3, FIG. 4, FIG. 5 and FIG. 6 show two first horizontal upper frameworks, namely upper framework 104A and lower framework 104B. Since these Figures are, in essence, a combination of FIG. 1 and FIG. 2, which have been completely described hereinabove. No further description is believed to be necessary to describe the erection of the STAF according to an embodiment of an aspect of the present invention in these FIG. 3 to FIG. 6.

Figure 4:
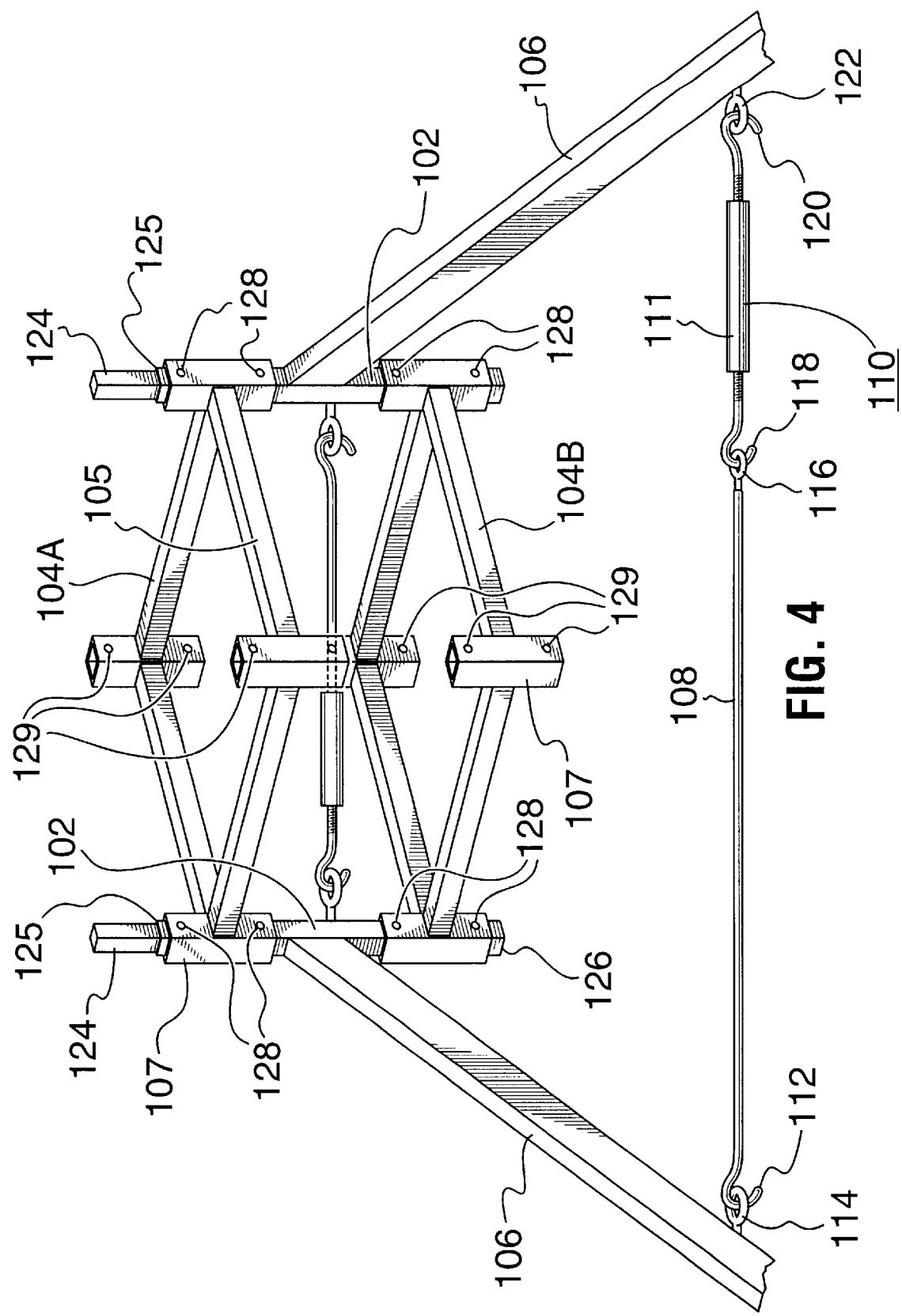
FIG. 4 is an isometric view of the operative elements of a stability alignment frame (STAF) of another embodiment of the present invention, wherein the stabilizing member forming an essential part of that embodiment of the present invention is disposed between the first framework and the second framework.

These two horizontal frameworks 104A and 104B are used in situations where extra stability is required. In FIG. 4, the two first stabilizing members are disposed between the upper horizontal framework 104A and the lower horizontal framework 104B.

Figure 5:
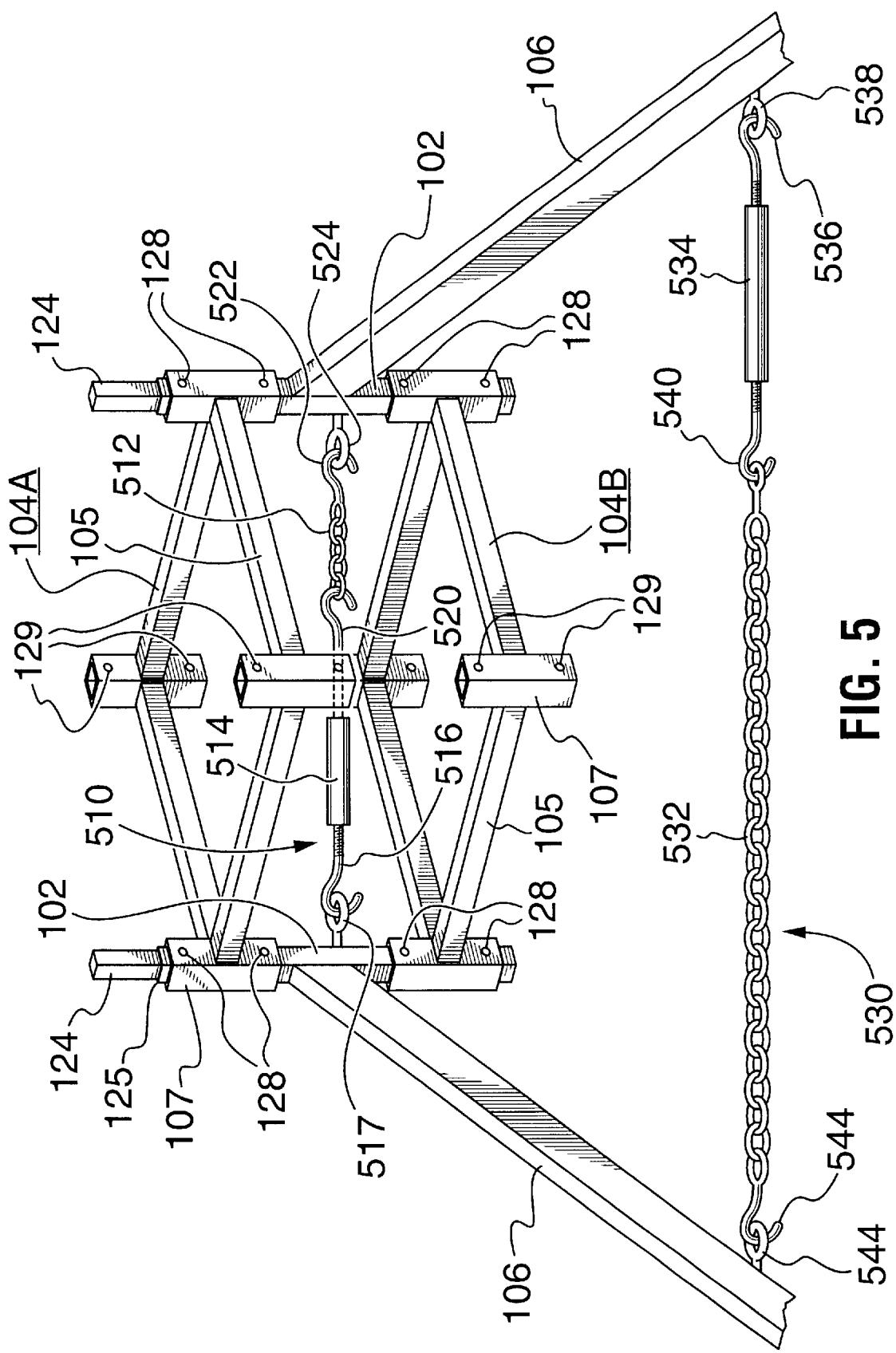
FIG. 5 is an isometric view of the operative elements of a stability alignment frame (STAF) of another embodiment of the present invention, wherein a first stabilizing member forming an essential part of that embodiment is disposed between the first framework and the second framework and a second stabilizing member is disposed below the legs.

FIG. 5 shows an embodiment of the present invention, in which different embodiments of the first upper stabilizing member 510 and the second lower stabilizing member 530 are used. The first upper stabilizing member 510 is shown as a chain 512 and a turnbuckle 514. The turnbuckle 514 includes a first threaded hook 516 which is hooked onto eye 517 which is secured to vertical post 102. The turnbuckle 514 also includes a second threaded bolt 520 which hooks onto one link of chain 512. The other end of chain 512 includes a hook 522 which hooks onto eye 524, which is secured to vertical post 102.

The second, or lower, stabilizing member 530 is shown as a chain 532 and a turnbuckle 534. The turnbuckle 534 includes a first threaded hook 536 which is hooked onto eye 538, which is secured to downwardly, outwardly-extending leg 106. The turnbuckle 534 also includes a second threaded hook 540 which hooks onto one link of chain 532. The other end of chain 532 includes a hook 542 which hooks onto eye 544, which is secured to the associated, non-adjacent downwardly, outwardly-extending leg 106.

These stabilizing members 510, 530 can only bring the four legs 106 together.

Figure 6:
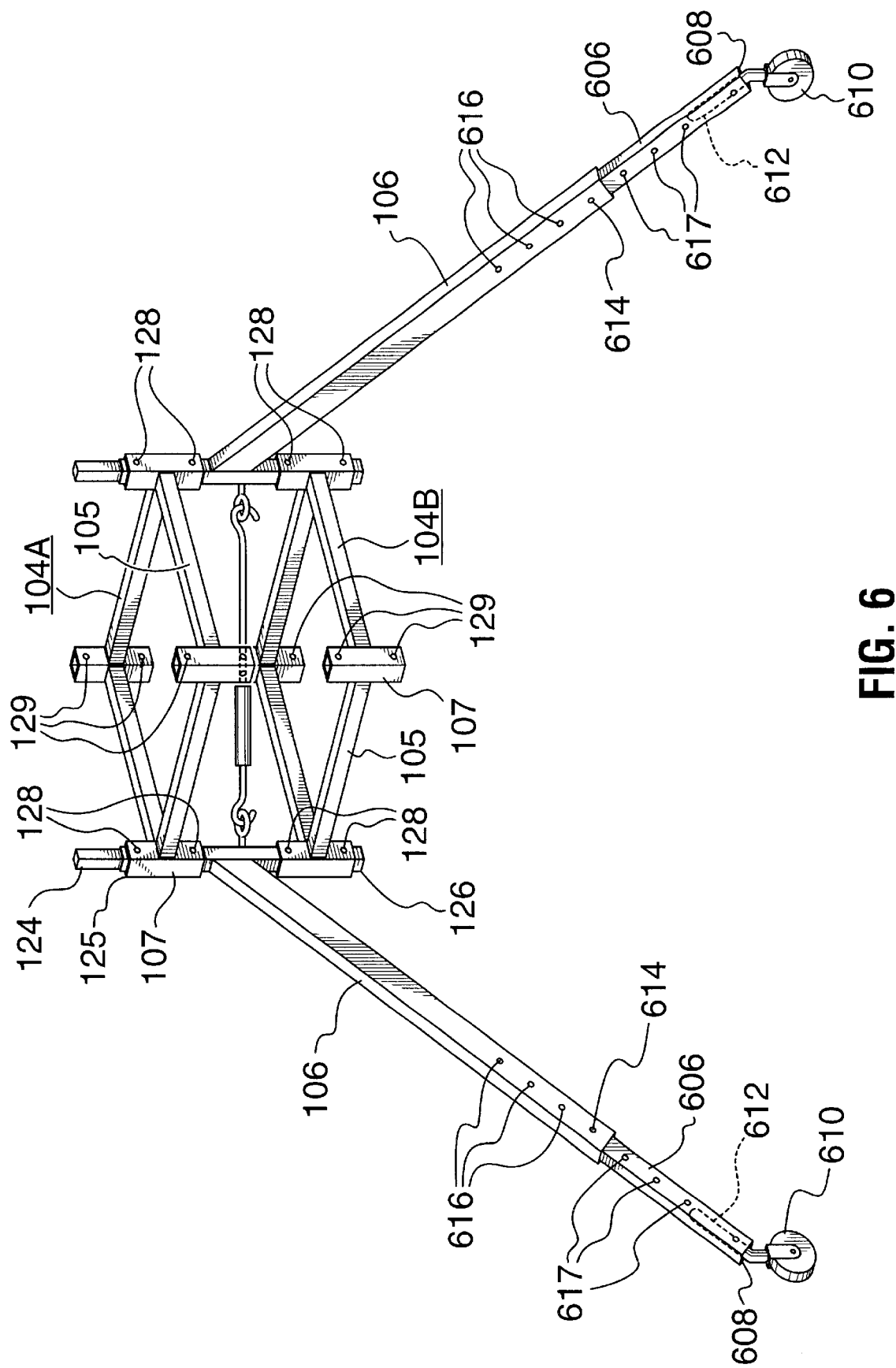
FIG. 6 is an isometric view of the operative elements of a stability alignment frame (STAF) of another embodiment of the present invention, wherein each leg forming an essential part of that embodiment of the present invention is provided with a caster.

(d) Description of FIG. 6

FIG. 6 shows one preferred embodiment of the base of the STAF according to an embodiment of the present invention. The upper portion of FIG. 6 is identical to FIG. 4, and so will not be further described. However, the lower portion of each of legs 106 is provided with a hollow telescopic insert 606, so that the length of the legs 106 may be adjusted. Such adjustments for the base of the STAF according to an embodiment of the present invention also may be used for the embodiments of FIGS. 1 to 5.

In the embodiment shown in FIG. 6, the lower end 608 of telescoping insert is fitted with a caster 610 which includes a shaft 612 which fits into the lower end 608 of the hollow telescoping insert 606.

The adjusted lengths of the legs 106 are maintained by means of bolts or cotter pins 614 which are inserted into respective aligned holes 616 in the legs 106 and 617 in the hollow telescoping insert 606.

Such adjustments for the base of the STAF according to an embodiment of an aspect of the present invention also may be used for each of the embodiments of FIGS. 1 to 5.

Figure 7:
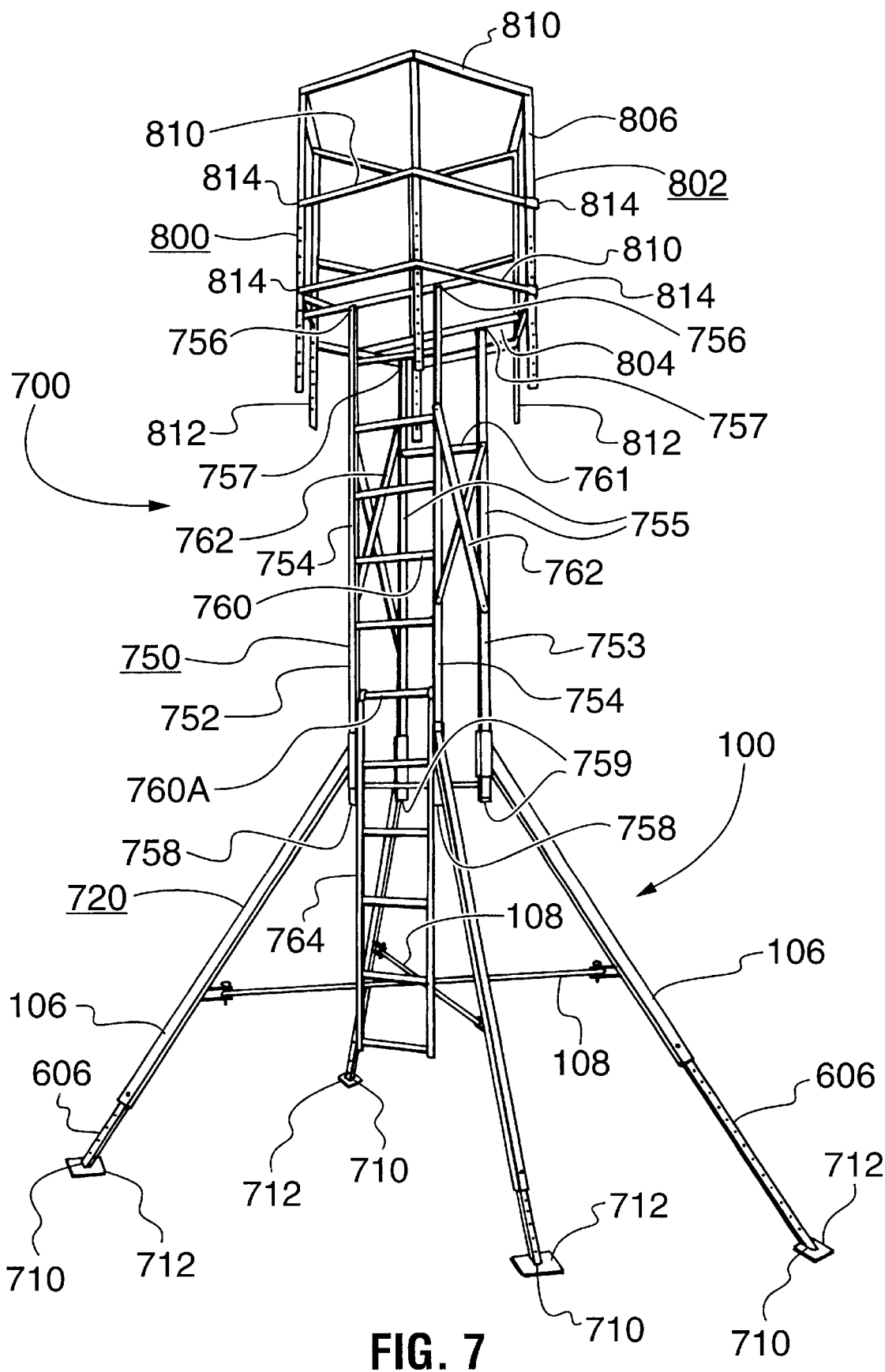
FIG. 7 is an isometric view of an assembled multi-purpose stand of an embodiment of the present invention.
Figures 8A, 8B:
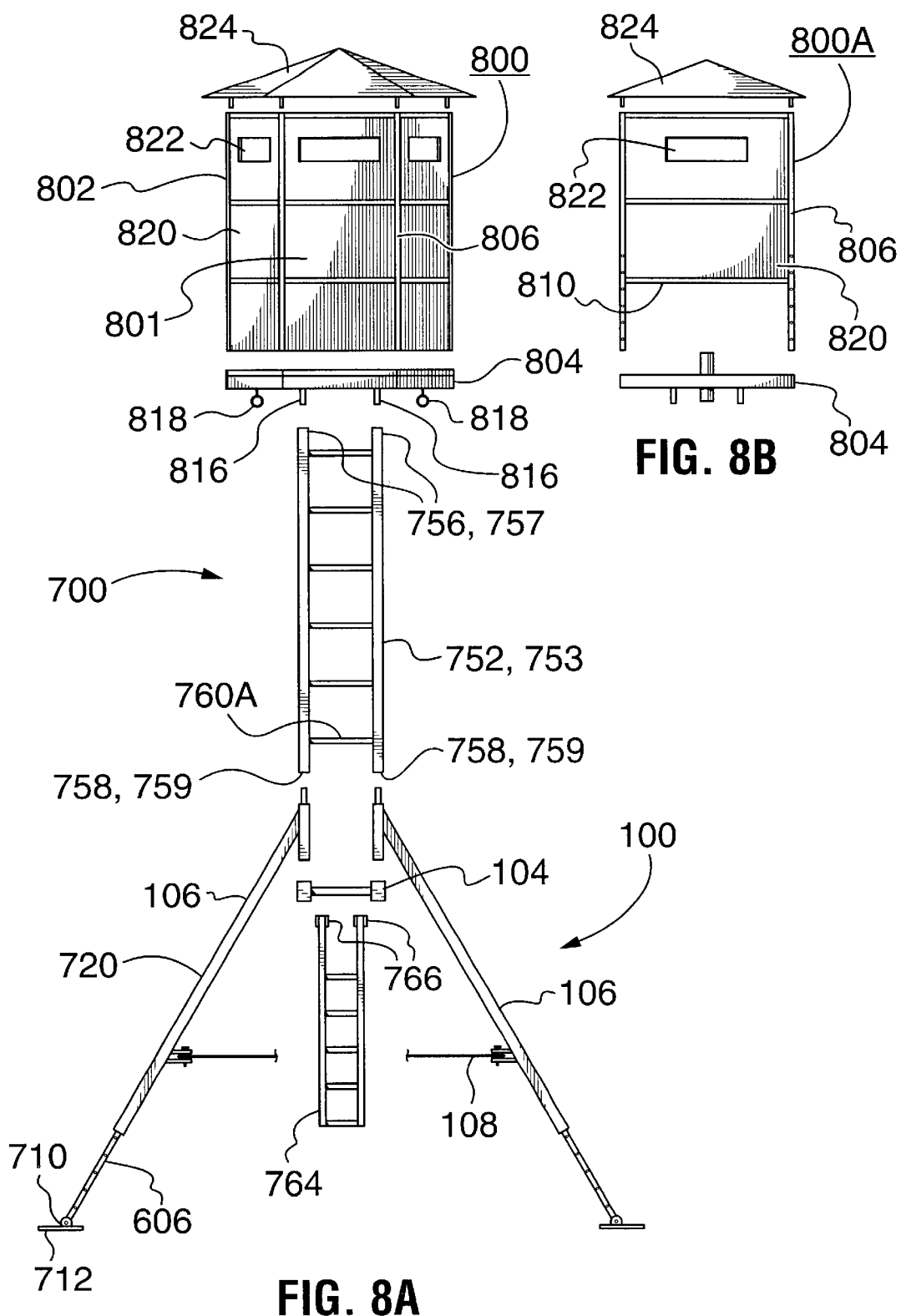
FIG. 8A is a partially exploded, front elevational view of the multi-purpose stand of the present invention, shown in FIG. 7, wherein different component elements are shown aligned but not assembled and in which one embodiment of a housing unit is shown.
FIG. 8B shows an alternative arrangement of a housing unit, in the embodiment of the multi-purpose stand of the embodiment of the present invention shown in FIG. 8A.

(e) Description of FIGS. 7, 8A and 8B

In the multi-purpose stand embodiment shown in FIG. 7 and FIG. 8A and FIG. 8B to be described in greater detail hereinafter, the STAF according to an embodiment of the present invention may be any one of the STAF according to embodiments of the present invention which are described in the embodiments of FIGS. 1 to 6. However, as shown in FIG. 7, the base 710 of each of the legs 106 is provided with a shoe or anchor plate 712 which each include an upstanding member 606 which fits into associated legs 106. The length is adjusted and maintained as described above with respect to the embodiment of the STAF according to an embodiment of the present invention of FIG. 6.

The stabilizing members 108, 510 and 530 in all the previously-defined embodiments of the STAF according to an embodiment of the present invention as described for FIGS. 1 to 6 may comprise a solid rod or brace, whereby an extensive or compressive force may be applied to the legs 106 to increase or decrease the footprint, respectively, or a chain, whereby a compressive force may be applied to the legs to decrease the footprint.

The legs 106 are hollow tubular members which can be of any geometrical shape and which preferably are each rectangular, i.e., square, in cross-section. As described above, the attachable hollow telescopic insert 606 into the base 710 of the legs 106 may be provided with anchor plates or shoes 712, where firm anchoring to the ground is used. They may alternatively be provided with casters 608 (as shown in FIG. 6) for moving the STAF according to an embodiment of an aspect of the present invention around in places, for example, indoor and outdoor studios, outdoor parking lots, and sound stages.

While the STAF of the embodiment shown in FIG. 7 and FIG. 8A and FIG. 8B has four legs, it is possible for the STAF to have only three legs, analogous to a tripod, or up to ten legs. One is able to stabilize a three-legged STAF according to an embodiment of an aspect of the present invention, or a multi-legged STAF according to an embodiment of the present invention, with suitable obvious changes.

The STAF 100 according to an embodiment of an aspect of the present invention as described with reference to FIGS. 1 to 6 can be used to erect a multi-purpose stand 700. FIG. 7, FIG. 8A and FIG. 8B show one preferred embodiment of the multipurpose stand 700 of the present invention, in which the multi-purpose stand 700 includes a STAF 720, a vertical riser section 750, and, as a vantage point, a housing unit 800.

The STAF 720 according to an embodiment of the present invention shown is that depicted in FIG. 1 and the reference numerals of FIG. 1 are used therein. As previously described, the base 710 of each of legs 106 is provided with a shoe or an anchor plate, 712 which is secured to associated upstanding member 606. The adjustment and maintenance of the length of the legs 106 is as previously described with reference to FIG. 6. The STAF 720 according to an embodiment of the present invention may, however, take any form, e.g., as shown in FIGS. 2 to 6.

The vertical riser section 750 comprises two vertical riser members which are in the form of front ladder 752 and rear ladder 753. The front ladder 752 comprises a pair of front vertical parallel rails 754, having respective upper ends 756 and respective lower ends 758. The front vertical parallel rails 754 are connected by a plurality of vertically spaced-apart rungs 760. Similarly, the rear ladder 753 comprises a pair of rear vertical parallel rails 755 having respective upper ends 757 and respective lower ends 759. The rear vertical rails 753 may be connected by a plurality of horizontal rungs only one of which, 761, is shown. Front ladder 752 and rear ladder 753 are strengthened and held together by cross-braces 762.

The front ladder 752 has a third ladder 764 appended to it adjacent to the bottom rung 760A and may be used for ascending and descending by the user from the ground to the front ladder 752. This third ladder 752 is suspended from front ladder 752, preferably by a pair of hooks 766 (shown in FIG. 8A and FIG. 8B). The ladders 752, 753 can be constructed to set lengths (i.e., 3', 6', 8', etc.) so that the user can select a vertical riser section 750 for the desired elevation. If the height of the STAF 720 according to an embodiment of an aspect of the present invention is sufficient, the vertical riser section 750 is optional. However, if such section 750 is used, the minimum length could be 3' and could increase in 1' or 2' increments to the desired length. For example, a user could assemble the multi-purpose stand 700 with a 3' vertical riser section 750. Alternatively, a user could assemble the multi-purpose stand 700 with a 6' vertical riser section 750. The upper limit in height of the vertical riser section 750 is variable. It is not a requirement for assembly and/or function of the multi-purpose stand. The users can add or remove the vertical riser section 750 to suit their needs. The third ladder 764 is attached to housing unit 800 in situations where the housing unit 800 is directly attached to the STAF 720.

The STAF 720 according to an embodiment of the present invention and ladders 752, 753 shown in FIGS. 7, 8A and 8B are connected to one another as follows: the vertical posts 102 of the STAF 720 according to an embodiment of the present invention are inserted into associated upstanding male pipe members 124 and they, in turn receive female sockets (unnumbered) of either vertical rise riser section 750 or the housing unit 800 (if no vertical riser section 750 is used). The male pipe members 124 may be separate pieces that are attachable to the respective vertical posts 102 through a suitable fastening means, e.g., a pin. Alternatively, the male pipe members 124 may be provided already welded to the respective vertical posts 102. In a preferred embodiment, the respective vertical posts 102 are fastened to the male pipe members 124 by nuts/bolts (unnumbered)

to allow for slight movement of the male pipe members 124, for alignment purposes. The male pipe members 124 are mainly used to align the STAF 720 according to an embodiment of the present invention, either with the vertical riser section 750 or with the housing unit 800 before fastening. The male pipe members 124 result in increasing overall strength of the multi-purpose stand 700.

Alternatively, any combination of pipe members/sockets which cooperate together to hold the STAF to the vertical riser section and/or to the housing unit may be used. Thus, for example, the STAF may provide the socket, and the vertical riser section and/or the housing unit may provide a depending pipe member.

The lower ends 758 of front ladder 752 and lower ends 759 of rear ladder 753 terminate in complementary female sockets (unnumbered). When male pipe members 124 are aligned with respective female sockets in the respective ladders, they fit interconnectingly with one another. It is equally possible for the STAF 720 according to an embodiment of the present invention to include the female sockets and for the front ladder 752 and rear ladder 753 to include the male pipe members 124.

The STAF 720 according to an embodiment of the present invention stabilizes the multi-purpose stand 700 by providing a resisting action to the movement of the male pipe 124 and the female sockets of the vertical riser section 750 and the housing unit 800 with respect to one another and locks those female and male members with respect to each other. This locking action is achieved by changing the footprint of the legs 106, thereby skewing the male pipe members with respect to the female socket members and thus providing a "wedging" action. Additional horizontal frameworks 104 may be added to the STAF according to an embodiment of the present invention (as shown in FIG. 3 to FIG. 6) for further strengthening the assembled multi-purpose stand 700. Additional stabilizing members 508, 530 may also be disposed between the two horizontal frameworks as shown in FIG. 5.

Two embodiments of housing units 800 are shown in FIG. 8A and FIG. 8B. In FIG. 8A, housing unit 800 comprises a three-dimensional framework in-the form of a hexagonal parallelepiped 802 including a hexagonal platform 804 to accommodate the user. The framework includes vertical posts 806 and horizontal plates 810, which are supported on the platform 804. The lower horizontal plates of housing unit 800 additionally act as a guard rail. The platform 804 is preferably made of wood. The platform 804 may include a trap door (not seen) to enable a user more easily to enter and leave the housing unit 800. For example, in the case of hexagonal platform 804, the platform 804 may be divided into three parts. The first part is pivotally attached to the second part, and the second part is pivotally attached to the third part. A user climbing to the housing unit 800 from below via ladder 752 can push one part of the platform 804 to create a trap door for entering. Upon entering onto the platform 804, the user can push the opened part back to cover the trap door and to create a continuous platform 804.

The hexagonal parallelepiped housing unit 800 has six vertical posts 806 and twelve horizontal plates 810. Tee-shaped sleeve members 814 are provided for interconnecting the posts 806 and the horizontal plates 810. The height of the hexagonal parallelepiped housing unit 800 can be adjusted by means of variable length vertical posts 806. Depending male members 816 are provided for connection to the associated sockets (not seen) in the upper ends 756, 757 of ladders 752, 753.

The hexagonal parallelepiped housing unit is supported on the hexagonal platform 804. Two extra frame members 812 are provided, which have female sockets therein (not seen) for connecting the housing unit 800 either to vertical riser section 750 or to STAF 700 according to an embodiment of an aspect of the present invention. Where the housing unit 800 is attached to the vertical riser section 750, the upper ends 756, 757 of the ladders 752, 753 of the vertical riser section 750 are connected to female sockets in the vertical posts 806 (not shown) via a second set of male members (not shown). The second set of male members is fixable to the upper ends 756 and 757 of the ladders 752, 753 by means of nuts/bolts or pins (not shown).

In the case where the housing unit 800 is connected directly to the STAF 720 according to an embodiment of an aspect of the present invention, i.e., without the vertical riser section 750, the female sockets (not shown) of the extra frame members 812 are disposed around the male pipe members 124 that are attached to the vertical posts 102 of the STAF 720 according to an embodiment of an aspect of the present invention. The extra frame members 812 may be provided with one or more respective rings 818 to be used for tying the multi-purpose stand 700 with ropes to a static anchor (not seen) for further stability.

As seen in FIG. 8B, the housing unit 800A is a three-dimensional framework in the form of a cubic housing unit which has four vertical posts and eight horizontal plates. In all other respects, except for the number of posts and plates it is the same as housing unit 800.

A cover 820 may be provided for covering at least the sides of the housing units 800, 800A to provide privacy and protection for both embodiments of the housing units shown in FIG. 8A and FIG. 8B. The cover 820 may have openings 822 for observing. The openings 822 of the cover 820 may be protected with a transparent synthetic material, e.g., the polymethylmethacrylate known by the trade-mark PLEXIGLAS™. A roof 824 may be provided over the housing unit 800, 800A to provide protection for the users and their belongings against inclement weather. The cover 820 and roof 824 may be made from waterproof cloth. The platform may also carry a chair (not seen) for the user. While not shown, the seat of the chair may be fixed to a rod having threads on one end that can be rotatably inserted into a threaded tube which is inserted in the platform 802.

The material for manufacturing various component elements of the multipurpose stand may be metal, resilient plastic, rubber, fiberglass, wood, or a combination thereof. While deciding the type of the material to be used, a person skilled in art is likely to consider the strength of the material, cost and weight. The metal for manufacturing the members of the multi-purpose stand may be aluminum, steel, brass, other alloys, or a combination thereof. While deciding the type of the metal to be used, the one skilled in art is likely to consider the strength of the material, cost and weight.

In a preferred embodiment, the following sizes of the various components were used: STAF 720 according to an embodiment of an aspect of the present invention=60"; vertical riser section 750=72"; and housing unit 800=60". Additional vertical riser sections 750 may be added to increase the height of the multi-purpose stand 700. A shorter STAF 720 according to an embodiment of an aspect of the present invention, for example, of 48" which is suitable for fitting in a car trunk and which can be made of resilient plastic for light weight, could be useful for bird watchers.

The various components 720 of the STAF according to an embodiment of an aspect of the present invention and the multi-purpose stand 700 may be sold as a kit, with or without packaging.

In summary, a stability alignment frame (STAF) according to an embodiment of the present invention for erecting a multi-purpose stand is provided herein. The STAF comprises a plurality of vertical posts, and a horizontal framework interconnecting adjacent posts. A leg is secured to an associated vertical post, each leg extending downwardly and outwardly. A first stabilizing member interconnects non-adjacent, opposed legs, thereby providing a plurality of interconnected legs. A first means is provided for applying a compressive or extensive force to the interconnected legs to change the spacing between the bases of a pair of interconnected legs in order to stabilize the STAF according to an embodiment of the present invention. In this way a wedging action is provided between the stability alignment frame and an elevated vantage point supported thereby, to prevent accidental disassembly. The STAF can be used to erect a multi-purpose stand as described hereinafter.

(5) Conclusion

From the foregoing description, one skilled in the art can easily ascertain the essential characteristics of this invention, and without departing from the spirit and scope thereof, can make various changes and modifications of the invention to adapt it to various usages and conditions. Consequently, such changes and modifications are properly, equitably, and "intended" to be, within the full range of equivalence of the following claims.

What is claimed is:

1. A stability alignment frame comprising:
   a plurality of vertical posts each having a top portion;
   a horizontal framework interconnecting adjacent posts;
   a leg having a base secured to each respective vertical post, each said leg extending downwardly and outwardly so as to form pairs of non-adjacent, opposed legs;
   a first stabilizing member interconnecting each pair of non-adjacent, opposed legs, thereby providing a plurality of interconnected legs; and
   a first structure for applying a force to said interconnected legs to change the spacing between the bases of a pair of said interconnected legs;
   whereby a wedging action is provided between the stability alignment frame and said top portions of said vertical posts that define an elevated vantage point supported thereon, thereby to prevent accidental disassembly.

2. A stability alignment frame according to claim 1, wherein said first structure for applying a force to said interconnected legs to change the spacing between the bases of a pair of said interconnected legs is selected from the group consisting of:
   a first structure for applying a compressive force to said interconnected legs, thereby to change the spacing between the bases of a pair of said interconnected legs by drawing said legs closer together, and a first structure for applying an extensive force to said interconnected legs, thereby to change the spacing between the bases of a pair of said interconnected legs by pushing said legs further apart.

3. The stability alignment frame according to claim 1 comprising at least one of four legs which converge and are oriented with respect to each other to meet at an imaginary apex, three legs which converge and are oriented with respect to each other to meet at an imaginary apex, and a plurality of legs which converge and are oriented with respect to each other to meet at an imaginary apex.

4. The stability alignment frame according to claim 1, wherein said vertical posts comprise a rectangular cross section, including at least one of (i) an upstanding male member for interconnection to a female socket of a further vertically-oriented member, and (ii) a female socket for interconnection with a depending male member of a further vertically-oriented member, and have a first upper end and a second lower end.

5. The stability alignment frame according to claim 1, wherein said horizontal framework is at least one of connected adjacent to said first upper ends of said vertical posts, connected adjacent to said second lower ends of said vertical posts, include a second horizontal framework which is connected to free ends of said vertical posts; and include a second stabilizing member which is disposed between said first horizontal framework and said second horizontal framework.

6. The stability alignment frame according to claim 1, wherein said stabilizing member comprises at least one of (i) a first stabilizing member which is disposed below the connection between said legs and associated vertical posts, (ii) a first stabilizing member which is disposed adjacent the connection between said legs and an associated said vertical post, (iii) a first stabilizing member which comprises a rod, whereby at least one of an extensive and compressive force may be applied to said legs, and (iv) a first stabilizing member which comprises a chain, whereby a compressive force may be applied to said legs.

7. The stability alignment frame according to claim 1, wherein said base is selected from the group consisting of each of said legs being provided with at least one of flat shoes and anchor plates, and each of said legs being provided with wheels.

8. The stability alignment frame according to claim 1, wherein at least one of said legs further includes a separate telescopic insert which is telescopically attachable to said leg, and is fixed at a selected position.

9. The stability alignment frame according to claim 1, wherein the material for manufacturing various components is selected from the group consisting of metal, resilient plastic, rubber, glass fibers, and wood and a combination thereof, and wherein said metal is selected from the group consisting of aluminum, steel, brass, other alloys, and a combination thereof.

10. A multi-purpose stand comprising:
    a stability alignment frame according to claim 1, and including:
    at least one of said vantage point and a housing unit which is connected to said stability alignment frame by male members and female sockets which are operatively associated with said stability alignment frame members and with said vantage point.

11. The multi-purpose stand according to claim 10, wherein said male members are provided on said stability alignment frame, and wherein cooperative female sockets are provided in at least one of said vantage point and in said housing unit.

12. The multi-purpose stand according to claim 10, additionally including a vertical riser section comprising a plurality of vertical ladders which are connected to said stability alignment frame and to at least one of said vantage point and said housing unit, preferably wherein said vertical ladders are connectable to said stability alignment frame at a first end by male members and female sockets which are operatively associated with said stability alignment frame and with said vertical riser section, and to at least one of said vantage point and said housing unit at a second end by male members and female sockets which are operatively associated with said vertical riser section and with at least one of said vantage point and said housing unit.

13. The multi-purpose stand according to claim 12, which is selected from the group consisting of those:
wherein said male members are provided on said vertical riser section, and wherein cooperative female sockets are provided in said stability alignment frame, wherein said male members are provided on said stability alignment frame, and wherein cooperative female sockets are provided in said vertical riser section, wherein depending male members are provided on at least one of said vantage point and said housing unit, and wherein cooperative female sockets are provided in said vertical riser section, wherein upstanding male members are provided on said vertical riser section, and wherein cooperative sockets are provided in at least one of said vantage point and said housing unit, and wherein said vertical riser section includes a front ladder and a rear ladder which are connected to said stability alignment frame at a first end and to at least one of said vantage point and said housing unit at second end, each said ladder having vertical parallel rails which are connected by horizontal rungs, and wherein said front ladder is connected to said rear ladder by braces.

14. The multi-purpose stand according to claim 12, wherein said vertical riser section further includes a third ladder which is selected from the group consisting of a ladder which is selectively attachable to at least one of said first ladder and said second ladder for ascending and descending to said selected ladder, and a ladder which is selectively attachable to said members of said upright vertical frame of at least one of said vantage point and said housing unit for ascending and descending.

15. The multi-purpose stand according to claim 10, wherein at least one of said vantage point and said housing unit is selected from the group consisting of those which: comprises a three-dimensional framework including a transverse frame which is erected from a plurality of frame members, further includes an upright frame which is erected from a plurality of vertical frame members and horizontal frame members for providing guard rail, includes a base platform, includes a platform which includes a trap door for entering and leaving at least one of said vantage point and said housing unit, includes a base platform which carries a chair for said user, includes a cover for privacy and protection, includes a cover for privacy and protection, wherein said cover has openings for observing, includes a cover for privacy and protection, and wherein said openings are provided with transparent coverings, includes a cover for privacy and protection, and wherein said openings are provided with transparent coverings, and further wherein said transparent coverings are made of a synthetic plastic material, includes a cover for privacy and protection, and wherein said openings are provided with transparent coverings, and further wherein said transparent coverings are made of a synthetic plastic material, and still further wherein said synthetic plastic material is polymethylmethacrylate, and which is covered with a roof to provide protection from inclement weather.

16. The multi-purpose stand according to claim 10, which further includes fixable rings for tying said multi-purpose stand with a rope to a static anchor.

17. The multi-purpose stand according to claim 10 comprising a height that is at least one of the height of said multi-purpose stand and the height of at least one of said vantage point and said housing unit.

18. The multi-purpose stand according to claim 10, wherein said male members are provided on at least one of said vantage point and in said housing unit, and wherein cooperative female sockets are provided in said stability alignment frame.

19. The multi-purpose stand according to claim 10, wherein the material for manufacturing various components is selected from the group consisting of metal, resilient plastic, rubber, glass fibers, and wood and a combination thereof, and wherein said metal is selected from the group consisting of aluminum, steel, brass, other alloys, and a combination thereof.

20. A kit comprising a plurality of components which are configured to be assembled to provide the stability alignment frame according to claim 1.

21. A kit comprising a plurality of components which are configured to be assembled to provide the multi-purpose stand according to claim 10.

* * * * *